G. H. WHITTINGHAM.
REVERSIBLE ELECTRIC MOTOR.
APPLICATION FILED MAR. 19, 1912.

1,070,647.

Patented Aug. 19, 1913.

2 SHEETS—SHEET 1.

WITNESSES

INVENTOR
G. H. Whittingham,
by Watson & Boyden,
Attorneys.

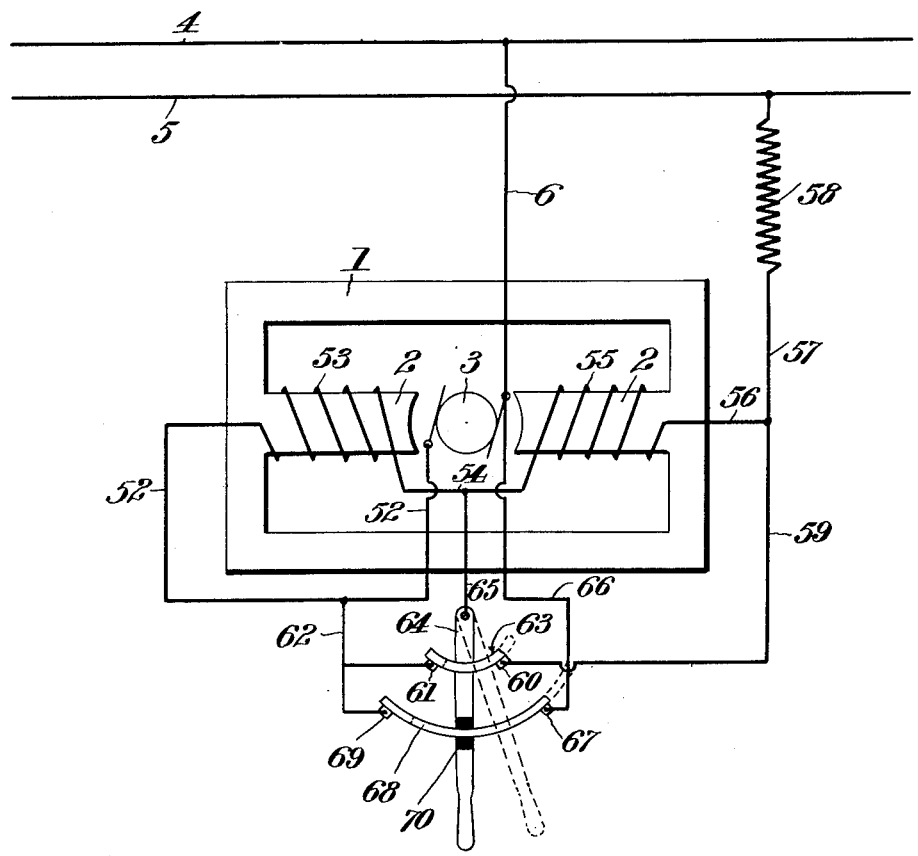

UNITED STATES PATENT OFFICE.

GEORGE H. WHITTINGHAM, OF PIKESVILLE, MARYLAND, ASSIGNOR TO MONITOR MANUFACTURING COMPANY OF BALTIMORE CITY, OF BALTIMORE, MARYLAND, A CORPORATION OF MARYLAND.

REVERSIBLE ELECTRIC MOTOR.

1,070,647.  Specification of Letters Patent.  Patented Aug. 19, 1913.

Application filed March 19, 1912. Serial No. 684,857.

*To all whom it may concern:*

Be it known that I, GEORGE H. WHITTINGHAM, a citizen of the United States, residing at Pikesville, in the county of Baltimore and State of Maryland, have invented certain new and useful Improvements in Reversible Electric Motors, of which the following is a specification.

My invention relates to electric motors, and more particularly to reversing means for such motors.

While applicable to motors of many types, my improved arrangement is designed especially for use in connection with motors of small size, such as are employed as "pilot" motors for controlling machinery of various kinds, and which are required to run intermittently in either direction.

The objects of the invention are to provide reversing means for motors of this character which shall operate without objectionable arcing or sparking, which shall be positive and quick in action, and which shall be simple in construction and comparatively inexpensive to install and maintain.

Figure 1:
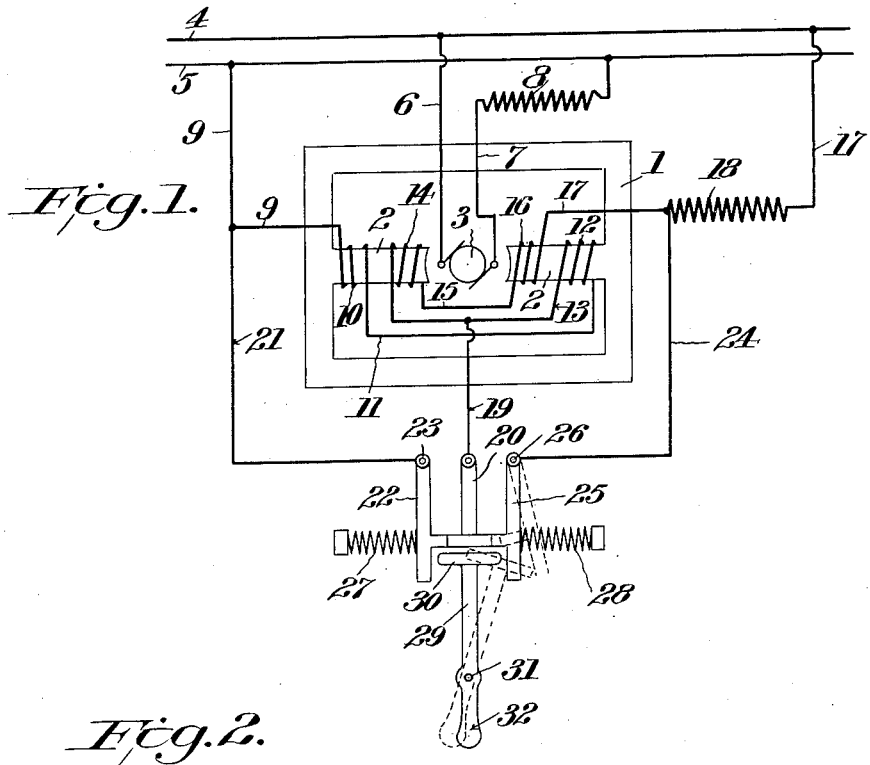
Figure 2:
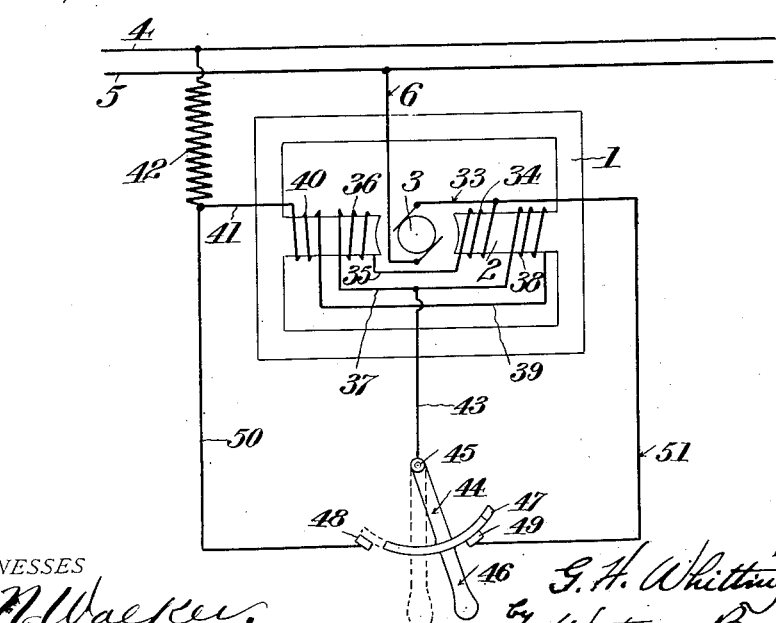

With the above objects in view, the invention consists in the arrangement of windings and controlling devices shown in the accompanying drawings, in which, Figure 1 is a diagram showing a shunt wound motor constructed in accordance with my invention, and a controlling device therefor; Fig. 2 is a similar view showing the invention applied to a series motor, and illustrating a slightly different form of controlling device; and, Fig. 3 is a similar view showing a slightly different arrangement as applied to a series wound motor.

Referring to the drawings in detail, and more particularly to Fig. 1, 1 designates conventionally the field frame of a motor which may be of any desired type, but which is illustrated as of bi-polar design, and which carries the inwardly projecting pole pieces 2. 3 designates the armature, which, in the arrangement shown in Fig. 1, is directly connected across the lines 4 and 5, or other suitable source of current, by means of the conductors 6, 7, a resistance 8 being interposed to limit the current flow when the armature is at rest. The field is provided with a differential shunt winding which is connected to one side of the line by a conductor 9. Such conductor extends first to a coil 10 on one of the pole pieces 2, thence through connection 11 to a coil 12 on the other pole piece, thence through a connection 13 to a coil 14 on the first pole piece, thence through a connection 15 to a coil 16 on the second pole piece, and this coil is connected by means of a conductor 17 with the other side of the line 4, a resistance 18 being interposed therein to prevent the excessive flow of current.

From a consideration of the circuit above traced it will be seen that the coils 10 and 12 represent one winding, while the coils 14 and 16 constitute the other winding, and that the direction of current flow through these coils is such that they tend to magnetize the pole pieces in opposite directions. It will also be noted that part of each winding is arranged on each pole piece, whereby a better magnetization is obtained. It will be further noted that all of the coils constituting the differential windings are connected in a permanently closed series circuit which, with the shunt arrangement shown in Fig. 1, is connected at its terminals directly across the line 4, 5.

In order to control the current flow through the windings just described and thus determine the direction of rotation of the motor, I provide a controlling switch which will now be explained. A conductor 19 is connected with the conductor 13 at a point between the windings 12 and 14, and is also connected to a contact device 20. From the conductor 9 extends a conductor 21 to a coöperating contact member 22, pivoted at 23. A similar conductor 24 extends from the conductor 17, at a point between the coil 16 and resistance 18, to a similar contact member 25, pivoted at 26. Springs 27 and 28 normally hold the contact members 22 and 25, respectively, into engagement with the central member 20. An actuating device 29 is provided, and is formed with a T-shaped head 30 which lies between the pivoted contact members 22 and 25. The actuating device is pivoted at 31 to a fixed support, and is provided with a handle 32.

In the position of the parts, as shown in full lines in Fig. 1, current normally flows from one side of the line 5, through conductors 9 and 21, contact elements 22, 20 and 25, conductor 24, resistance 18, and conductor 17 to the other side of the line 4, thereby entirely short-circuiting all of the field windings. Under these conditions the field is deenergized and the motor remains at rest, although current is flowing through its armature. Such current is limited by the resistance 8. When it is desired to have the motor rotate in one direction, the controlling device 29 is swung on its pivot 31 to the position shown in dotted lines, thus moving contact member 25 out of engagement with the contact member 20. Current then flows over the path just traced as far as contact member 20, and thence over conductor 19 and by way of connection 13 through coil 14, connection 15, coil 16, conductor 17 to the other side of the line. This energizes the field poles in one direction and the motor revolves. When it is desired to rotate the motor in the opposite direction, the actuating device 29 is swung to the left, so as to move contact member 22 out of engagement with contact member 20. Current then flows through conductor 9 and coils 10 and 12, and thence through connection 19 and conductor 24 as above described, thus energizing the pole pieces in the opposite direction and causing the motor to revolve.

It will be observed that at no time does current flow through both field windings. Normally such windings are both short-circuited, and the short-circuit is removed from one winding while maintained around the other, so that one or the other winding may produce the desired energization of the field.

I am aware that it has heretofore been proposed to provide a motor with differential windings both of which are normally supplied with current when the motor is at rest, the neutralization or balancing of such windings being depended upon to prevent rotation. In actual practice, however, it is very difficult to construct these windings so that they will exactly balance and there will, therefore, nearly always be a slight energization of the field which will cause the motor to have a tendency to "creep." By normally short-circuiting both of the windings when the motor is at rest I obviate this difficulty and insure a complete deënergization of the field.

In Fig. 2, the arrangement is substantially the same except that the armature 3 is connected at one side by the conductor 6 to the line 5, and at the other side by a conductor 33 to one end of the field winding. This field winding comprises coils, 34, 36, 38, 40 corresponding in arrangement to coils 16, 14, 12 and 10, respectively, in Fig. 1. A single resistance 42 therefore suffices to limit the current through both armature and field.

Instead of the controlling device shown in Fig. 1, I have shown a slightly different and even more simple arrangement. This consists merely in a lever 44 pivoted at 45, and carrying an arc-shaped blade 47. This blade, when the lever is in the position shown in dotted lines, is adapted to engage and bridge contacts 48, 49, connected by wires 50 and 51 to each end of the field windings. When the lever is in the position shown in full lines, current flows from line 5, through conductor 6, armature 3, conductor 33, conductor 51, contact 49, blade 47, lever 44, conductor 43, coil 38, connection 39, coil 40, conductor 41 and resistance 42 to the other side of the line 4, thus energizing the pole pieces and causing rotation of the motor in one direction. When swung to the other side, the lever 44 short-circuits coils 38 and 40 and permits current to flow through coils 34 and 36, thus producing rotation of the motor in the reverse direction.

As a still further safe-guard against the "creeping" of the motor, when the fields are deënergized, I may employ the arrangement shown in Fig. 3. In this figure, I have shown means for normally short-circuiting not only the field windings, but also the armature. In this figure, I have shown the pole pieces 2 of the motor as provided with a pair of series coils 53, 55, differentially wound and connected by means of a conductor 54. A conductor 52 connects one end of coil 53 with one brush of the armature 3 while wires 56 and 57 connect the free end of coil 55 with one of the line conductors 5, a resistance 58 being interposed in the circuit to prevent excessive current flow when short circuiting takes place. From wire 57 extends a wire 59 to a contact 60, and from a similarly disposed contact 61 extends a conductor 62 to the wire 52. A contact blade 63 carried by a pivoted lever 64 is adapted to bridge the contacts 60 and 61 when in its normal position, and a wire 65 connects the lever with the conductor 54. A conductor 6 extends from one of the main lines 4 to a brush of the commutator, and from thence extends a wire 66 to a contact 67, adapted to be engaged by an arc-shaped blade 68 carried by the lever 64, but insulated therefrom, as indicated at 70. When the lever is in normal position, the contact blade 68 is adapted to connect contact 67 with a similar contact 69, connected with the wire 62. It will be seen, therefore, that in the position of the parts shown in full lines in Fig. 3, both the armature and field coils are short-circuited, the current passing from conductor 66, contact 67, blade 68, contact 69, conductor 62, contact 61, blade 63, contact 60, wires 59 and 57, resistance 58, to main 5. It will be observed that current flowing in this normally closed circuit is limited only by the resistance 58. When, however, the lever 64 is swung to one side, as indicated in dotted lines, the blade 68 is moved out of engagement with contact 69 thereby removing the short-circuit from armature 3 and admitting current thereto, and, at the same time, blade 63 is moved out of engagement with contact 61 thus removing the short-circuit from coil 53. Under these circumstances current flows as follows: conductor 6, armature 3, conductor 52, field coil 53, conductor 54, wire 65, blade 63, contact 60, wires 59 and 57 and resistance 58, to the other side of the line. This produces rotation of the motor in one direction, and when it is desired to have it run in the opposite direction the lever is swung to the other side of its central position, thus bringing coil 55 into operation and maintaining a short-circuit about coil 53. It will, of course, be understood that the above described arrangement for short-circuiting the armature may be carried out with either the shunt or series winding of the fields, and with such windings distributed as shown in Figs. 1 and 2.

It will thus be seen that I have provided a very simple reversing means for small electric motors, by the use of which no circuits are broken upon reversal, and thereby sparking prevented, and at the same time the wasteful consumption of current is very small, owing to the employment of resistances, and it is thought that the many advantages of the invention will be readily appreciated by those familiar with such matters.

What I claim is:—

1. The combination with a motor comprising an armature and field, of differential windings for said field, means for normally short circuiting both of said windings, and means for admitting current to either one of said windings while maintaining a short circuit around the other.

2. The combination with a motor comprising an armature, a field frame, and pole pieces carried by said frame, of differential windings for said pole pieces, part of each winding being arranged on each pole piece, and means for supplying current to one or the other of said windings.

3. The combination with a motor comprising an armature, a field frame, and pole pieces carried by said frame, of differential windings for said pole pieces, part of each winding being arranged on each pole piece, said windings being connected in a permanently closed series circuit, and means for short circuiting one or the other of said windings.

4. The combination with a motor comprising an armature and field, of differential windings for said field, means for normally short-circuiting both said windings and said armature, and means for admitting current to said armature and either field winding while maintaining a short circuit around the other field winding.

5. The combination with a motor comprising armature and field, means for normally short-circuiting said armature and maintaining said field deënergized, and means for admitting current to said armature and energizing said field in one direction or the other in accordance with the direction of rotation to be produced.

6. The combination with a motor having an armature and field, of a source of current therefor, a permanently closed circuit connecting said armature with said source, means including a part of said circuit for supplying said armature with current and thus causing it to rotate, means for short-circuiting said armature to stop the rotation thereof, and means for preventing an excessive flow of current when such short-circuiting takes place.

7. The combination with a motor comprising an armature and field, of differential windings for said field, both of said windings being in series with the armature circuit, means for normally short circuiting both of said windings, and means for admitting current to either of said windings while maintaining a short circuit around the other.

In testimony whereof I affix my signature, in presence of two witnesses.

GEORGE H. WHITTINGHAM.

Witnesses:
JOHN S. ROWAN,
AMALIA AHRLING.